United States Patent [19]
Lewis et al.

[11] Patent Number: 5,894,863
[45] Date of Patent: Apr. 20, 1999

[54] PIPE PLUGGING APPARATUS

[76] Inventors: Tommy D. Lewis, P.O. Box 2966, Santa Cruz, Calif. 95063; Herbert O. Smith, 3098 Winkel Ave., Santa Cruz, Calif. 95065

[21] Appl. No.: 09/129,548

[22] Filed: Aug. 5, 1998

[51] Int. Cl.⁶ .................................................. F16L 55/12
[52] U.S. Cl. ........................... 138/93; 138/89; 138/97; 137/223; 137/228
[58] Field of Search ............................ 138/93, 90, 97, 138/89; 137/614.04, 614.05, 228, 231, 223; 251/61.1

[56] References Cited

U.S. PATENT DOCUMENTS

| | | | |
|---|---|---|---|
| 938,522 | 11/1909 | Swain | 137/228 |
| 1,510,212 | 9/1924 | DuBois | 138/93 X |
| 1,846,189 | 2/1932 | Downs | 137/231 |
| 2,459,716 | 1/1949 | Nickelsen et al. | 137/223 |
| 2,843,154 | 7/1958 | Hosking | 138/93 |
| 3,120,859 | 2/1964 | Wakley | 138/93 |
| 3,276,481 | 10/1966 | McNulty | 138/93 |
| 3,278,205 | 10/1966 | Barlow | 137/614.05 X |
| 4,021,265 | 5/1977 | Guenther | 138/93 X |
| 4,155,373 | 5/1979 | DiGiovanni | 138/93 X |
| 4,762,115 | 8/1988 | Penner | 138/93 X |
| 4,787,659 | 11/1988 | Durham | 138/93 X |
| 5,324,045 | 6/1994 | Trawick et al. | 137/223 X |
| 5,357,763 | 10/1994 | Vogel | 138/93 X |
| 5,477,886 | 12/1995 | Van Beugen et al. | 138/93 |

*Primary Examiner*—Patrick Brinson
*Attorney, Agent, or Firm*—Jeffrey A. Hall

[57] ABSTRACT

A pipe plugging apparatus for use stopping the flow of water or other fluids in a pipe during pipe repair and construction, comprising a hand-held pump, the hand-held pump has a hand activated screw element for moving a piston for pushing water or other fluids within the pump. The hand-held pump has a cylindrical housing with an adjustable pressure relief knob at a first end and a filler intake port and an air bleeder valve positioned at a second end. The cylindrical housing includes a check valve and an aperture at the second end adapted for securing an intrusion tube connector. An intrusion tube with a connector check valve secured on a first end is secured to the hand-operated pump. One or more intrusion tubes may be linked together and provided either empty or fluid pre-filled. A water inflatable balloon is secured to a second end of the intrusion tube by a ribbed connector element.

15 Claims, 2 Drawing Sheets

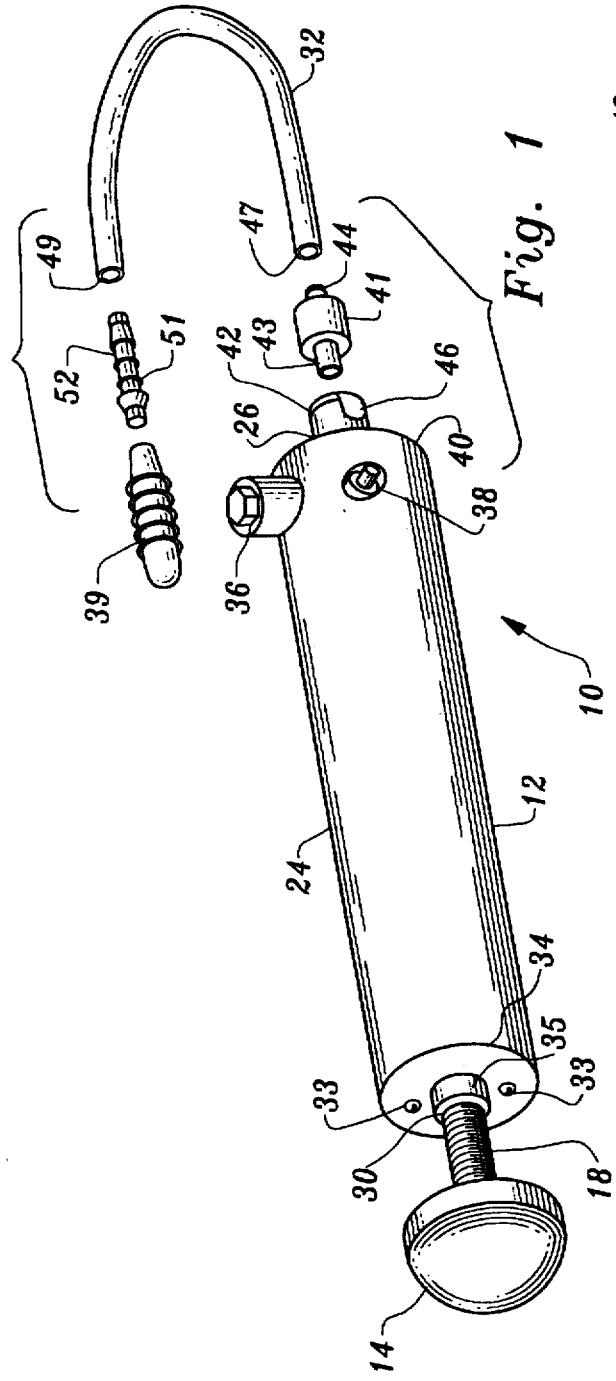
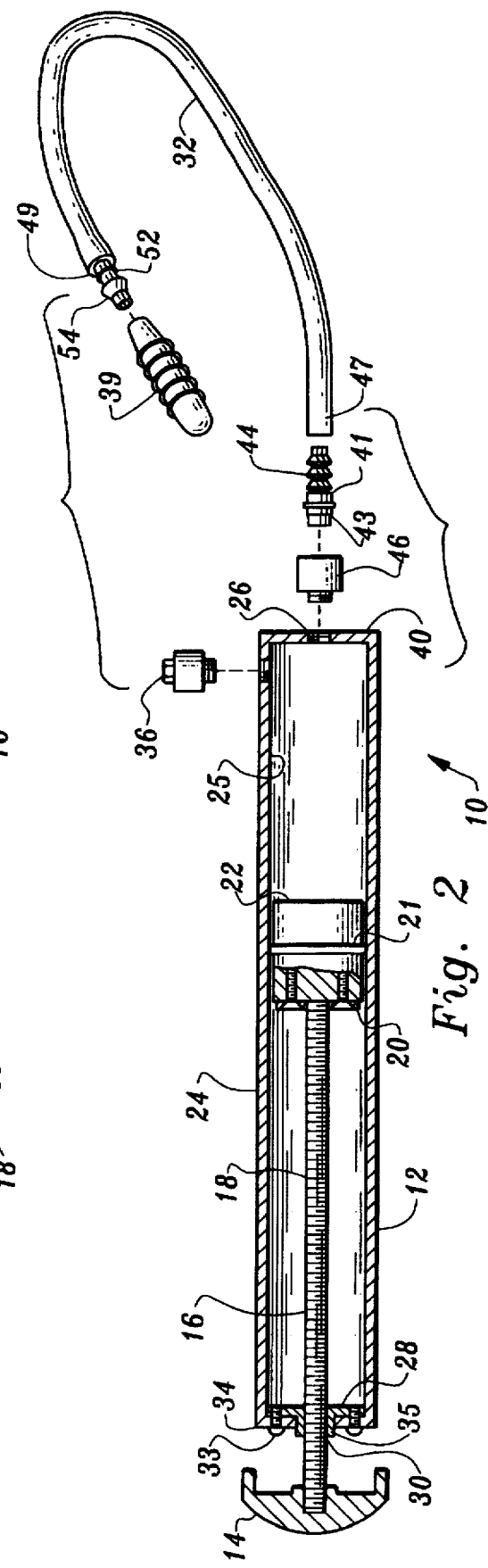

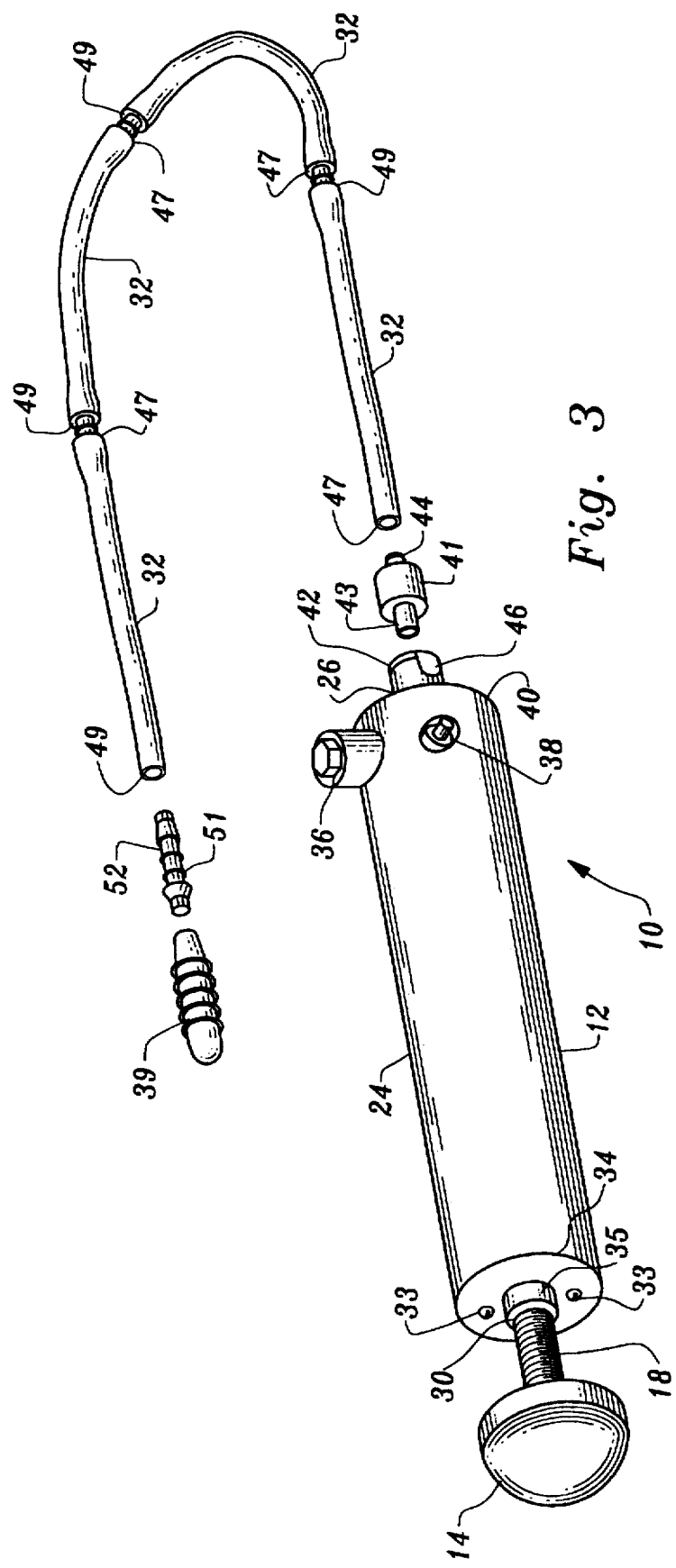

PIPE PLUGGING APPARATUS

BACKGROUND OF THE INVENTION

1. Field of Invention

This invention relates to pipe plugging apparatuses, and more particularly to pipe plugging apparatuses which utilize a fluid inflatable and deflatable pump to stop water or other liquids from flowing through a pipe to facilitate repairs to the pipe.

2. Description of the Related Art

Various pipe plugging apparatuses have been proposed and implemented to facilitate the repair of pipes by stopping the flow of water or liquids through the pipe when repairs are in progress. Such apparatuses have been limited due to their complexity, inefficiencies, operational difficulties, and their use of air inflatable stopper elements.

Representative of such genre are U.S. Pat. No. 2,857,933 issued Oct. 28, 1958 to Lithun for a conduit plugging device; U.S. Pat. No. 3,841,355 issued Oct. 15, 1974 to Laner for a pipe plugging tool; U.S. Pat. No. 4,398,565 issued to Williamson Apr. 16, 1993 for a pipe plugging apparatus; U.S. Pat. No. 4,790,356 issued to Tash Dec. 13, 1988 for a drain plugging device; U.S. Pat. No. 4,612,961 issued Sep. 23, 1986 to Vetter for a tube sealing device; and, U.S. Pat. No. 4,660,603 issued Apr. 28, 1997 to Tash for a drain plug device. None of these proposed devices offer a satisfactory solution to the problems associated with repair of pipes and conduits. Such limitations undoubtedly have been a reason that such devices have not received widespread acceptance.

Accordingly, it is the primary object of this invention to provide a pipe plugging apparatus to facilitate the repairs of pipes and other conduits using a fluid inflatable and deflatable pump, intrusion tube, and balloon connected to the intrusion tube by a barbed element. The apparatus of the present invention is inexpensive to manufacture, easy to use, quickly deployable, and quickly and easily stored when not in use. The pipe plugging apparatus of the present invention may be used many times before replacement, does not require modification of tools, pipes, conduits, or the like for its deployment, and provides multiple positioning possibilities so that it can be used regardless of the type or size of pipe being plugged.

Additional objects and advantages of the invention will be set forth in the description which follows, and in part will be obvious from the description, or may be learned by practice of the invention. The objects and advantages of the invention may be realized and obtained by means of the instrumentality's and combinations particularly pointed out in the appended claims.

SUMMARY OF THE INVENTION

To achieve the foregoing objects, and in accordance with the purpose of the invention as embodied and broadly described herein, a pipe plugging apparatus for use stopping the flow of water or other fluids in a pipe during pipe repair and construction is provided, comprising a hand-held pump, the hand-held pump has a hand activated screw element for moving a piston for pushing water or other fluids within the pump. The pump includes a water compression reservoir space and preferably has a cylindrical housing with an adjustable pressure relief knob at a first end and a filler intake port and an air bleeder valve positioned at a second end. The cylindrical housing includes a check valve and an aperture at the second end adapted for securing an intrusion tube connector. An intrusion tube with a connector check valve is secured on a first end to the hand-operated pump. One or more intrusion tubes may be linked together and provided either empty or fluid pre-filled. A water inflatable balloon is secured to a second end of the intrusion tube by a ribbed connector element.

The pump is configured so that it cannot pump unless it is connected to the intrusion tube having the balloon connected at one end. This is because the check valve does not open until the user connects a second check valve attached to the intrusion tube, which may be paired with the first check valve, making an open system which enables the pump to push fluid through the intrusion tube into the balloon. Accordingly, both check valves must be connected in order for the apparatus to work and there must be no air in the system. The pump uses the bleeder valve which when released allows all air to escape from the intrusion tube, balloon, and pump enabling a closed system free of air. For deflation, all fluids return to the compression reservoir of the pump by releasing the release valve on the second end of the pump.

The pipe plugging apparatus of the present invention may be provided in a variety of shapes and sizes to accommodate different pipes and work environments. The present invention is configured to permit rapid deployment of the apparatus in any size pipe or conduit, and is very efficient, safe, and reliable.

BRIEF DESCRIPTION OF THE DRAWINGS

The accompanying drawings, which are incorporated in and constitute a part of the specification, illustrate a preferred embodiment of the invention and, together with a general description given above and the detailed description of the preferred embodiment given below, serve to explain the principles of the invention.

FIG. 1 is a top perspective view a pipe plugging apparatus, according to the invention.

FIG. 2 is a sectional view of such pipe plugging apparatus, according to the invention.

FIG. 3, is a perspective view of the pipe plugging apparatus showing multiple intrusion tubes linked together, according to another embodiment of the invention.

DESCRIPTION OF THE PREFERRED EMBODIMENTS

Reference will now be made in detail to the present preferred embodiments of the invention as illustrated in the accompanying drawings.

In accordance with the present invention, there is provided in a preferred embodiment of the invention, a pipe plugging apparatus for use stopping the flow of water or other fluids in a pipe during pipe repair and construction, comprising a hand-held pump, the hand-held pump has a hand activated screw element for moving a piston for pushing water or other fluids within the pump. The hand-held pump has a cylindrical housing with an adjustable pressure relief knob at a first end and a filler intake port and an air bleeder valve positioned at a second end. The cylindrical housing includes a check valve and an aperture at the second end adapted for securing an intrusion tube connector. An intrusion tube with a connector check valve secured on a first end is secured to the hand-operated pump. One or more intrusion tubes may be linked together and provided either empty or fluid pre-filled. A water inflatable balloon is secured to a second end of the intrusion tube by a ribbed connector element.

In accordance with the present invention, there is also provided an improved pipe plugging apparatus for stopping the flow of fluids through a pipe or other conduit, for use when repairing, fusing, soldering, and adding fittings to a pipe, comprising a pump having a hand operated screw element for moving piston means for moving fluids. The pump preferably has a cylindrical housing with an adjustable pressure relief knob at a first end and an intake port and an air bleeder valve positioned at a second end. The housing also has a check valve and an aperture at said second end adapted for securing and receiving an intrusion tube connector element. An intrusion tube is secured to the second end of the pump and a fluid inflatable balloon is secured to the intrusion tube by a connector element.

In FIG. 1, the pipe plugging apparatus 10 for stopping the flow of water or other fluids during pipe repair and construction, is shown according to a preferred embodiment of the invention. Pipe plugging apparatus 10 includes a hand-held pump 12 having a hand activated screw element 14 secured to a piston 16. Hand-held pump 12 has a housing 24 which is preferably cylindrical with a first end 34 and a second end 40. A filler intake port 36 and an air bleeder valve 38 are positioned near second end 40. The filler intake port 36 and air bleeder valve 38 may be separate or combined in different embodiments. An aperture 26 at second end 40 is sized and adapted to receive a check valve 42 with quick release 46 and an intrusion tube connector 41 with barbs or ridges 44 for securing connector 41 into intrusion tube 32. A second check valve 43 may be provided secured to connector 41. With this arrangement, pump 12 cannot pump unless it is connected to intrusion tube 32. Alternatively, barbs or ridges 44 may be replaced by the use of bonding or adhesives. This is because of check valve 42 on pump 12 which is not opened unless it is connected with check valve 43 which is attached to intrusion tube 32 via connector 41. Both check valves must be connected for the pump to work. Accordingly, there must be no air in the system. Air may be expelled by opening bleeder valve 38 which allows air from pump 12, intrusion tube 32, and balloon 39 to escape.

In FIG. 2, piston 16 is shown comprising threaded rod 18 with mounting plate 20, o-ring 21, and pressure cylinder 22 secured thereto. Threaded rod 18 is operably positioned in aperture 30 of guide plate 28 with threaded guide 35. Guide plate 28 is preferably secured to housing 24 with screws 33, or other mechanical fastening means such as bolts, rivets, or the like. Piston 16 is hand operated to push water or other fluids within pump 12, compressing the water in water compression reservoir 25 and then through valve 42 and intrusion tube connector element 41.

As seen in FIG. 2, intrusion tube connector 41 is secured in first end 47 of intrusion tube 32. Intrusion tube 32 is a flexible tube which can be maneuvered around corners, bends, and pipe joints. Preferably, intrusion tube 32 is composed of a flexible polymer, which may include, plastic, rubber, or the like. Intrusion tube 32 is connected at a second end 49 to a water or fluid inflatable balloon 39. Balloon 39 is connected to intrusion tube 32 by a connector element 51 with ribs or barbs 52. Alternatively, balloon 39 may be secured to intrusion tube 32 with adhesives or other mechanical fastening means. Balloon 39 may be provided in a wide variety of sizes, For example, a ½ inch size could be used on ½ inch and ¾ inch pipes. A 1 inch size could be used on 1 inch, 1¼ inch and 1½ inch pipes. A 2 inch, 3 inch, 4 inch and other size balloons can be used if desired. Note that since balloon 39 is inflated with water or other fluid only, this allows for the use of a hand operated pump. If similar pressures were to be achieved using air or other gas, it would be extremely difficult to achieve this using a manual or hand operated pump. After balloon 39 has been inflated with water or other fluid, pump 12 may be disconnected by via check valves 42 and 43, while allowing the balloon to remain inflated with water or other fluid because the closed system's integrity is maintained.

Referring now to FIG. 3, it is seen how check valve 43 and connector 41 allow for extensions of intrusion tube 32 to any length desired by either using multiple intrusion tubes, or various lengths of an intrusion tube. Intrusion tube 32 may also be provided pre-filled with water or liquid, so that the filled tube may be attached to pump 12 for immediate use.

In operation and use pipe plugging apparatus 10 is very convenient, easy to use, reliable, and effective for blocking the flow of water or fluids through a pipe or other conduit. It may be used for any repair work on pipes, such as fusion of pipes, soldering joints and adding fittings to pipes. Apparatus 10 operates by using water or other fluid pumped by pump 12 to inflate balloon 39 via intrusion tube 32. The pump cannot be operated unless it is connected to intrusion tube 32 because of check valve 42 which does not open unless it is connected to check valve 43 on intrusion tube connector 41. As both check valves must be connected for the system to work, all air must be expelled from the system which is accomplished by opening air bleeder valve 38. By opening air bleeder valve 38, air from balloon 39, intrusion tube 32, and pump 12, is expelled from apparatus 10. For deflation of balloon 39, the water or other fluid being used is returned into water compression reservoir 25 of pump 12 by retraction of threaded rod 18 and pressure cylinder 22 by rotating knob 14. If desired, once balloon 39 has been inflated by water or other fluid, pump 12 may be disconnected by disconnecting check valves 42 and 43 which allow the closed system to be maintained while balloon 39 remains inflated.

Additional advantages and modification will readily occur to those skilled in the art. The invention in its broader aspects is, therefore, not limited to the specific details, representative apparatus and illustrative examples shown and described. Accordingly, departures from such details may be made without departing from the spirit or scope of the applicant's general inventive concept.

What is claimed is:

1. A pipe plugging apparatus for use stopping the flow of water or other fluids during pipe repair and construction, comprising:

a hand-held pump, said hand-held pump having a hand activated screw element positioned at a first end thereof for moving a piston for pushing water within said pump; said hand-held pump having a cylindrical housing with a filler intake port and an air bleeder valve positioned at a second end thereof; said cylindrical housing having a check valve and an aperture at said second end adapted for securing an intrusion tube connector thereto:

an intrusion tube, said intrusion tube having a connector check valve secured on a first end thereof; said intrusion tube being secured to said hand-operated pump; and a water inflatable balloon, said water inflatable balloon being secured to a second end of said intrusion tube by a ribbed connector element.

2. The pipe plugging apparatus of claim 1, wherein said piston comprises a threaded rod secured to a mounting plate mounted to a pressure cylinder.

3. The pipe plugging apparatus of claim 1, wherein said cylindrical housing includes a guide plate with a threaded aperture secured to said first end of said cylindrical housing.

4. The pipe plugging apparatus of claim 1, wherein said intrusion tube connector includes a plurality of barb elements.

5. The pipe plugging apparatus of claim 1, wherein said check valve on said cylindrical housing includes a quick release connection element.

6. The pipe plugging apparatus of claim 1, wherein said intrusion tube is filled prior to use with a fluid.

7. The pipe plugging apparatus of claim 1, wherein a plurality of intrusion tubes are linked together whereby said water filled balloon may be extended any desired distance within a pipe.

8. A pipe plugging apparatus for stopping the flow of fluids through a pipe or other conduit, for use when repairing, fusing, soldering, and adding fittings to a pipe, comprising:

a pump including a hand operated screw element positioned at a first end thereof for moving piston means for moving fluids; said pump having a housing with an intake port and an air bleeder valve positioned at a second end; said housing having a check valve and an aperture at said second end adapted for securing and receiving an intrusion tube connector element;

an intrusion tube, said intrusion tube having a connector check valve secured on a first end thereof; said intrusion tube being secured to said second end of said pump; and a water inflatable balloon, said water inflatable balloon being secured to said intrusion tube by a connector element.

9. The pipe plugging apparatus of claim 8, wherein said piston comprises a threaded rod secured to a mounting plate mounted to a pressure cylinder.

10. The pipe plugging apparatus of claim 8, wherein said cylindrical housing includes with a threaded aperture secured to said first end of said cylindrical housing.

11. The pipe plugging apparatus of claim 8, wherein said tube connector element includes a plurality of barb elements.

12. The pipe plugging apparatus of claim 8, wherein said check valve includes a quick release connection element.

13. The pipe plugging apparatus of claim 8, wherein said intrusion tube is filled prior to use with a fluid.

14. The pipe plugging apparatus of claim 8, wherein a plurality of intrusion tubes are linked together whereby said water filled balloon may be extended any desired distance within a pipe.

15. The pipe plugging apparatus of claim 8, wherein said connector element is connected to said intrusion tube by bonding.

* * * * *